(12) United States Patent
Schmon et al.

(10) Patent No.: US 6,877,677 B2
(45) Date of Patent: Apr. 12, 2005

(54) PAINT SPRAYING GUN

(75) Inventors: Ewald Schmon, Grafenberg (DE);
Peter Dettlaff, Remseck (DE)

(73) Assignee: Sata Farbspritztechnik GmbH & Co. KG, Kornwestheim (DE)

( * ) Notice: Subject to any disclaimer, the term of this patent is extended or adjusted under 35 U.S.C. 154(b) by 19 days.

(21) Appl. No.: 10/423,037

(22) Filed: Apr. 24, 2003

(65) Prior Publication Data

US 2003/0213857 A1 Nov. 20, 2003

Related U.S. Application Data

(63) Continuation of application No. PCT/EP02/13966, filed on Dec. 10, 2002.

(51) Int. Cl.[7] .................................................. B05B 7/30
(52) U.S. Cl. ........................................ 239/346; 411/412
(58) Field of Search ................................ 239/323, 328, 239/345, 346, 375–379; 222/549; 285/73, 360; 411/369, 353, 533, 999, 309–311, 324, 399, 412, 413; 292/44, 160

(56) References Cited

U.S. PATENT DOCUMENTS

| | | | |
|---|---|---|---|
| 2,116,036 A | * | 5/1938 | Money ........................ 411/309 |
| 3,645,562 A | | 2/1972 | Fandetti et al. |
| 5,503,439 A | * | 4/1996 | LaJeunesse et al. .......... 292/44 |
| 5,662,444 A | * | 9/1997 | Schmidt, Jr. ................. 411/369 |
| 6,092,740 A | * | 7/2000 | Liu ............................. 239/346 |
| 6,431,466 B1 | * | 8/2002 | Kitajima ...................... 239/346 |
| 6,712,292 B1 | * | 3/2004 | Gosis et al. ................. 239/345 |

FOREIGN PATENT DOCUMENTS

| | | |
|---|---|---|
| DE | 460 381 C | 5/1928 |
| DE | 89 02 223 U | 5/1989 |
| FR | 1 410 519 A | 9/1964 |

* cited by examiner

Primary Examiner—David A. Scherbel
Assistant Examiner—Thach H. Bui
(74) Attorney, Agent, or Firm—Martin Fleit; Paul D. Bianco; Fleit Kain Gibbons Gutman Bongini & Bianco P.L.

(57) ABSTRACT

A paint spraying gun with a gun body and a material supply device that are connected to one another by a screw-wedge connection. The screw-wedge connection includes a screw-wedge element that is arranged on the circumference of an essentially hollow-cylindrical connecting part of the material supply device, and a corresponding counter element on the gun body. The connection is inexpensively manufactured and easily handled. The screw-wedge element extends in an arc over more than half of the circumference of the connecting part with the ends of the screw-wedge element being peripherally spaced from one another. The counter element is an arcuate projection arranged on one side of and above a receiving bore of the gun body.

19 Claims, 5 Drawing Sheets

PAINT SPRAYING GUN

RELATED APPLICATION

This application is a continuation of International Application No. PCT/EP02/13966 filed Dec. 10, 2002, the contents of which are here incorporated by reference in their entirety.

BACKGROUND OF THE INVENTION

1. Field of the Invention

The invention pertains to a paint spraying gun, to a connecting part for the material supply device of a paint spraying gun, and to a paint receptacle.

2. Prior Art

In conventional paint spraying guns, the connection between the gun body and a paint receptacle or another material supply device, e.g., a hose or a pipe feed, is frequently realized with the aid of a thread that comprises several turns. In this case, the gun body contains, for example, a connecting bore that is provided with an internal thread, into which the external thread of a connecting part of the paint receptacle or the hose or pipe feed is screwed. However, several turns are required in order to produce a tight connection and to separate said connection. This is associated with a significant expenditure of time.

In some modern paint spraying guns, the connection between the gun body and a paint receptacle is produced with the aid of a so-called screw-wedge connection. A connection of this type is disclosed in DE 89 02 233 U1. In this case, two opposing screw-type wedges are arranged on a connection piece of the cup-shaped paint receptacle, wherein two opposing L-shaped projections on the upper side of the gun body overlap said screw-wedges. In such a screw-wedge connection, a paint receptacle placed onto the gun body can be attached to and removed from the gun body by turning the paint receptacle by 90°. However, the turning angle of 90° requires a correspondingly high angle of inclination of the wedge surfaces of both screw-wedges that contact the projections. This means that no self-locking effect can be ensured, and that the connection may loosen. In addition, the manufacture of two opposing L-shaped projections on the gun body and of the two corresponding screw-wedges is relatively complicated, and consequently quite costly.

SUMMARY OF THE INVENTION

The invention is based on the objective of developing a connection for the material supply device of a paint spraying gun which can be manufactured less expensively and handled more easily.

More particularly, the invention accomplishes the object by providing a construction for a paint spraying gun which is characterized by certain improvements. In a paint spraying gun with a gun body and a material supply device that can be connected to one another by a screw-wedge connection, wherein the screw-wedge connection comprises a screw-wedge element that is arranged on the circumference of an essentially hollow-cylindrical connecting part of the material supply device and a corresponding counter element on the gun body, the improvement comprising the screw-wedge element having a gap clearance and extending over more than half of the circumference of the connecting part, and the counter element being arranged on a one-sided projection situated above a receiving bore of the gun body.

In a paint spraying gun according to the above, the improvement of the screw-wedge element is realized in the form of a wedge-type profile that protrudes from the connecting part, and the counter segment is realized in the form of a wedge-type groove arranged on the inner side of the projection. Further, the screw-wedge element and the counter element are, respectively, realized in the form of only part of one turn of the corresponding outside thread and internal thread. In the novel construction, the connecting part contains a guide region for lateral guidance within the receiving bore.

In a paint spraying gun according to the invention, the screw-wedge segment contains a continuously inclined upper wedge surface that comes in contact with a corresponding counter surface of the counter segment. Also, the screw-wedge segment has a triangular or trapezoidal profile.

In a paint spraying gun according to the invention, an additional mounting thread is arranged on the connecting part, and the receiving bore contains a counter surface that makes contact with a sealing surface of the connecting part. Also, in the construction of the invention, the projection on the gun body has a smaller width than the gap between the beginning and end of the screw-wedge element, and the material supply device consists of a paint receptacle.

The invention also contemplates a connecting part for the material supply device of a paint spraying gun, containing a screw-wedge element that can be engaged with a corresponding counter element on a gun body of a paint spraying gun, wherein the screw-wedge element contains a gap and extends over more than half of the circumference of a connecting region of the connecting part. The connecting part can further comprise a guide region for being laterally guided in a receiving bore of the gun body. Also, the screw-wedge element is realized in the form of an outwardly protruding wedge-type profile, and the screw-wedge element is realized in the form of a partial turn of an external thread. The screw-wedge element can have a triangular or trapezoidal profile. Also, the connecting part can further comprise an additional mounting thread.

The invention further contemplates a paint receptacle for a paint spraying gun, comprising a connecting part as described above, and the connecting part is firmly connected to the paint receptacle. Also, the connecting part can be realized integrally with the paint receptacle.

These objectives are attained with a paint spraying gun with the characteristics as described above, a connecting part with the characteristics described above, and a paint receptacle with the characteristics described above. Practical configurations and advantageous additional developments of the invention will be apparent from the disclosure.

In comparison with conventional connections, the concept according to the invention makes it possible to rapidly and easily attach and detach a material supply device, e.g., a paint receptacle, a pipe feed, or a hose, in a particularly simple and cost-efficient fashion. The invention eliminates the need for complicated connecting and sealing elements.

The screw-wedge element provided for engagement with the corresponding counter element on the gun body extends over more than half of the circumference of the connecting part, wherein a gap is produced between the beginning and the end of the peripheral screw-wedge element. A one-sided projection above a receiving bore of the gun body is able to engage into this recess when the lower guide region of the connecting part is inserted into the receiving bore. The counter element provided for engagement with the screw-wedge element is arranged on the one-sided projection. The screw-wedge element and the counter element are adapted to one another in such a way that the screw-wedge element is tightened within the counter element when the connecting part inserted into the receiving bore is turned. This means that the connecting part is held in the gun body. Since the screw-wedge element extends over more than half of the circumference, the angle of inclination of the wedge-shaped clamping surfaces can be reduced such that a self-locking effect can be ensured.

In one practical embodiment, the screw-wedge element is realized in the form of a wedge-shaped profile that protrudes from the connecting part, wherein the corresponding counter element is realized in the form of a wedge-shaped groove on the inner side of the projection. However, it would also be possible to arrange the wedge-shaped groove on the connecting part, in which case the protruding wedge-shaped profile is arranged on the projection.

In another advantageous embodiment, a sealing surface is provided on the connecting part and comes in sealing contact with the corresponding counter surface in the interior of the receiving bore when the connecting part is mounted to the gun body.

In another practical embodiment, an additional mounting thread is provided on a lower insert section of the connecting part. This mounting thread is intended for engagement with the internal thread provided on conventional paint spraying guns for attaching a paint receptacle. This makes it possible to also utilize the connecting part with customary paint spraying guns that have a conventional internal thread in the receiving bore.

The connecting part may, for example, be realized in the form of an adapter that is connected to a conventional paint receptacle or another material supply device. The connecting part may, however, also be realized integrally with the paint receptacle, or in the form of a part that is firmly connected to the paint receptacle or the like.

BRIEF DESCRIPTION OF THE FIGURES OF THE DRAWING

Other details and advantages of the invention are discussed in the following description of one preferred embodiment that refers to the figures. In the figures.

DETAILED DESCRIPTION OF PREFERRED EMBODIMENTS OF THE INVENTION

Figures 1A, 1B:
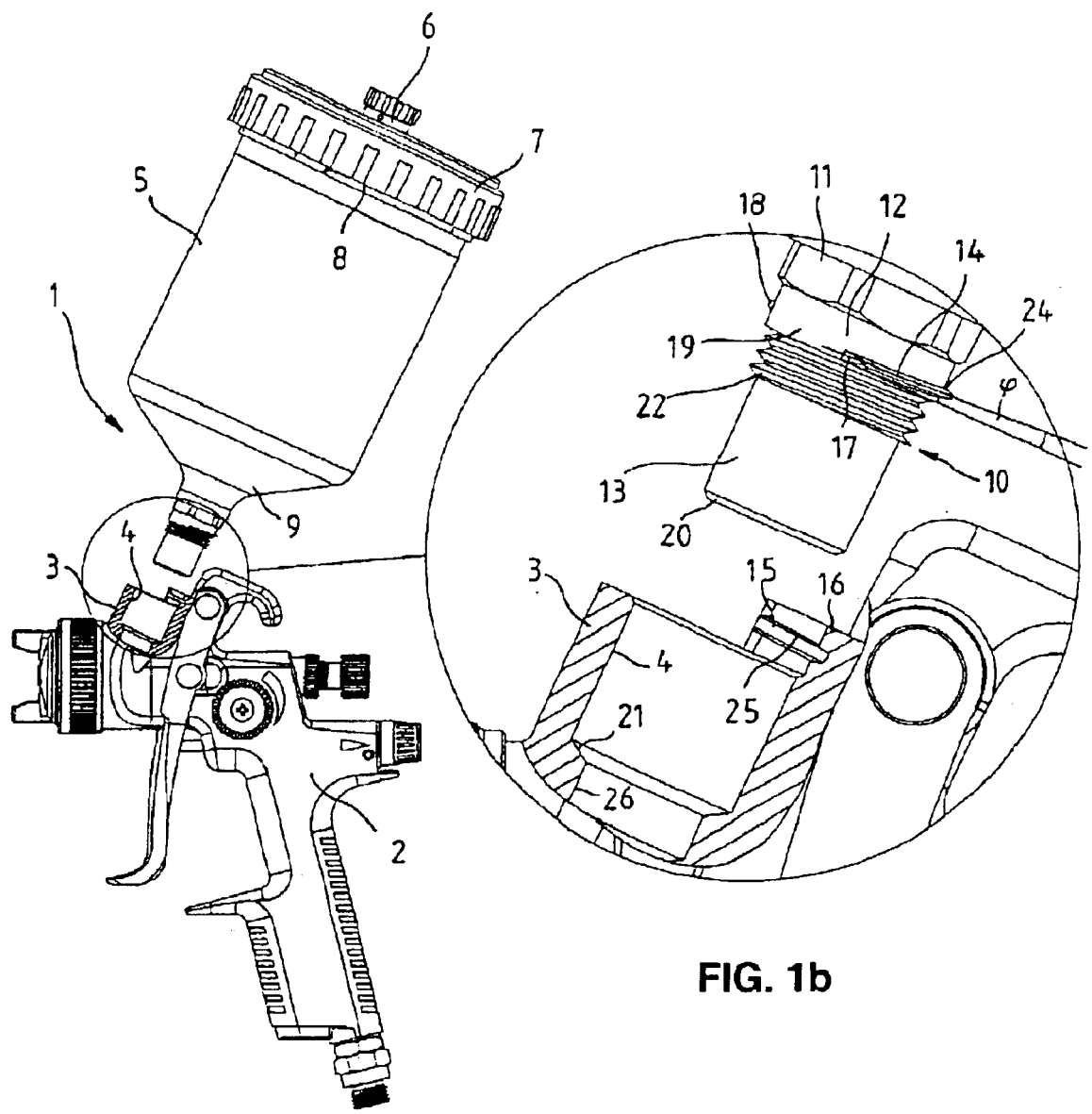
FIG. 1a shows a paint spraying gun according to the invention with a detached paint receptacle, as well as, in FIG. 1b an enlarged detail of the connecting region between the gun body and the paint receptacle.
Figures 2A, 2B:
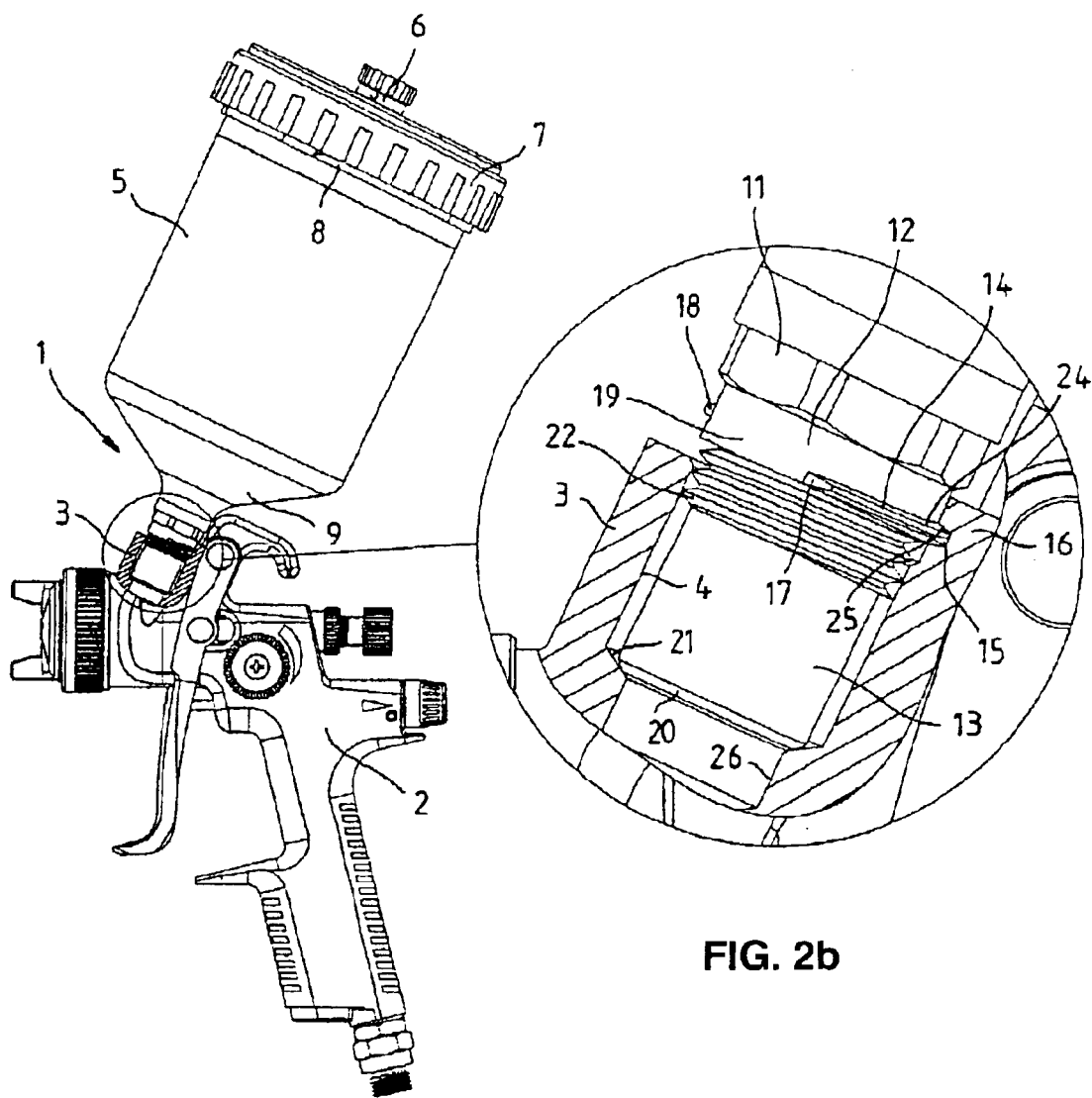
FIG. 2a shows a paint spraying gun according to the invention with an attached paint receptacle, as well as, FIG. 2b an enlarged detail of the connecting region between the gun body and the paint receptacle.
Figures 3A, 3B:
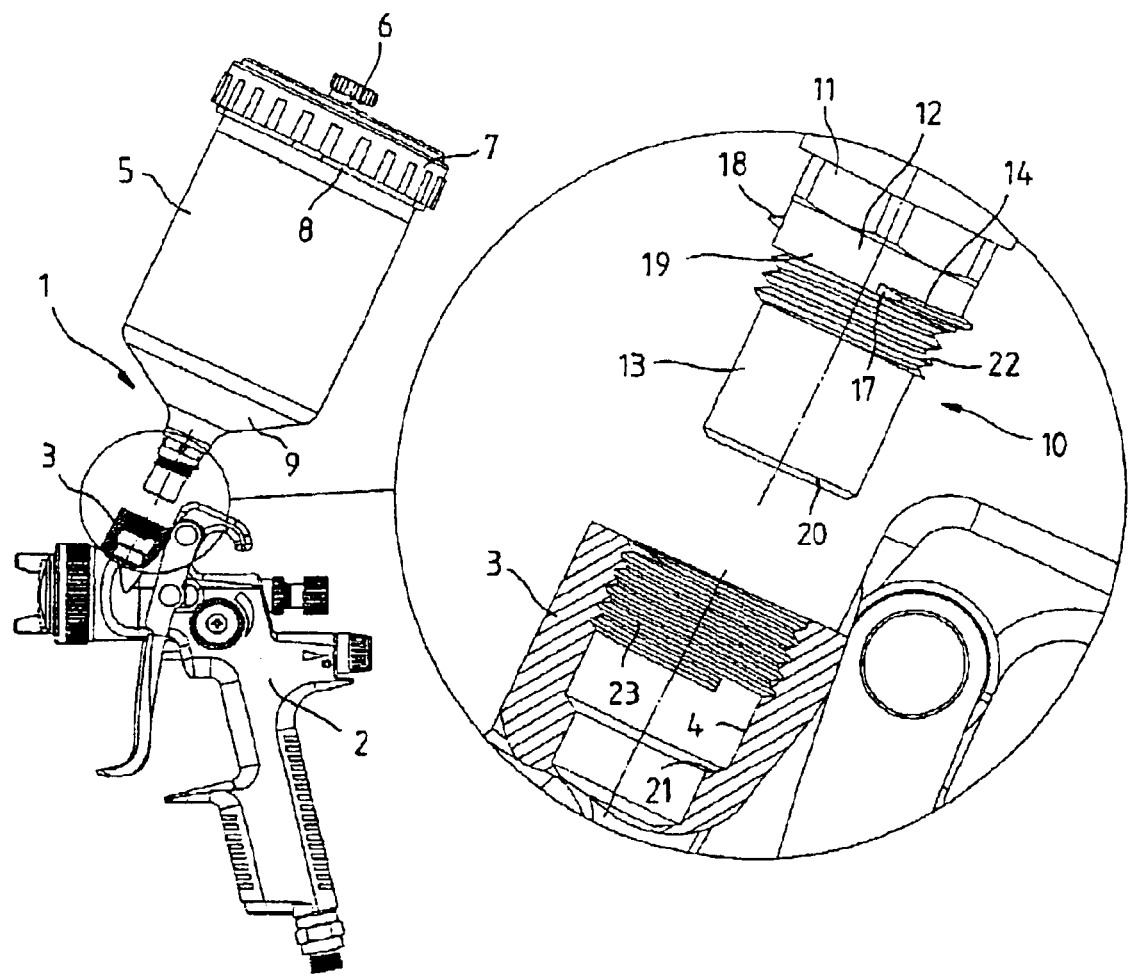
FIG. 3a shows a standard paint spraying gun with an internal thread and a detached paint receptacle, as well as, FIG. 3b an enlarged detail of the connecting region between the gun body and the paint receptacle.
Figures 4A, 4B:
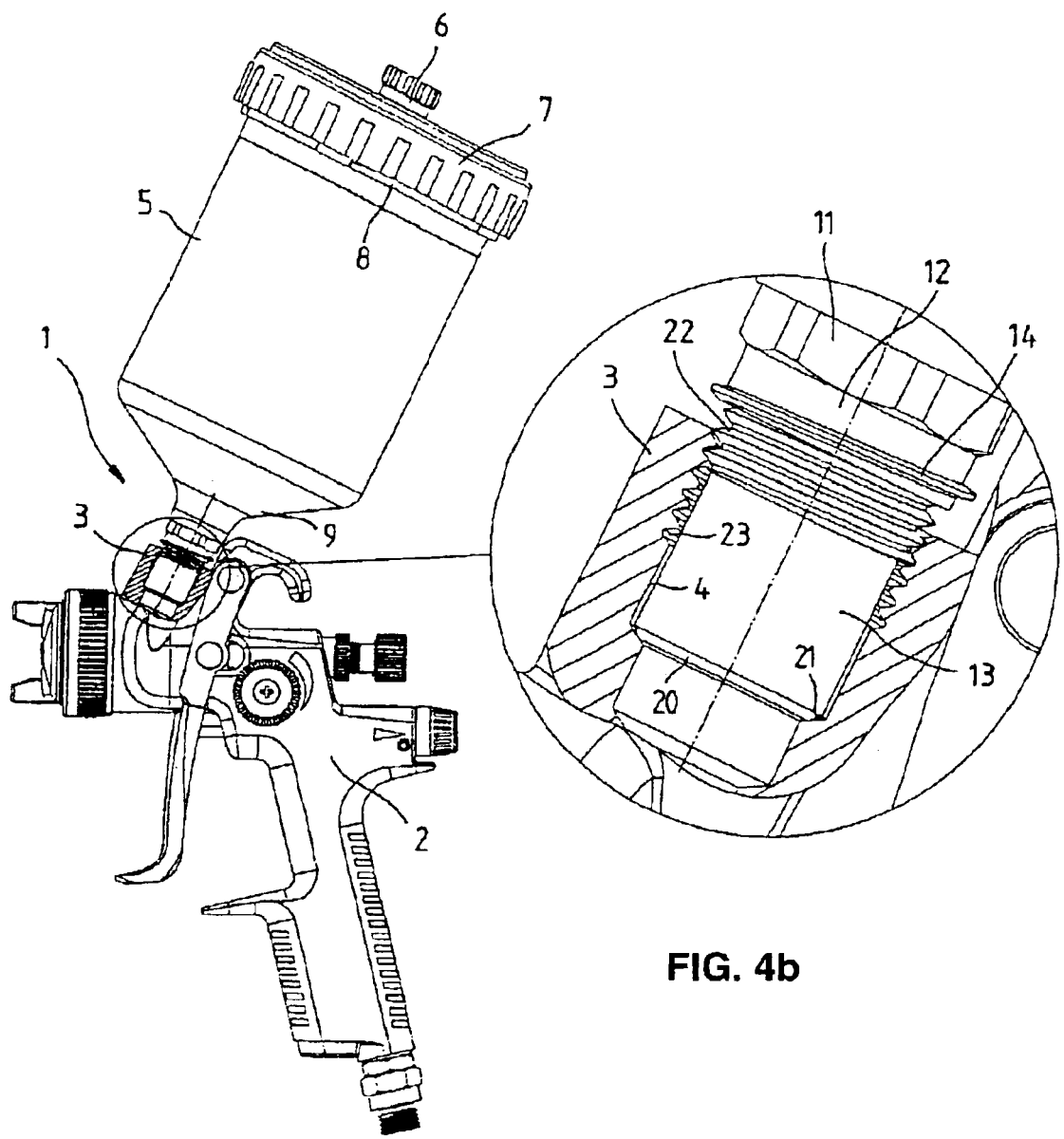
FIG. 4a shows a standard paint spraying gun with an internal thread and an attached paint receptacle, as well as, FIG. 4b an enlarged detail of the connecting region between the gun body and the paint receptacle.

FIGS. 1a, 1b, 2a and 2b show a paint spraying gun 1, the gun body 2 of which contains a connecting region 3 with a receiving bore 4 for removably attaching a paint receptacle in the form of a gravity feed container 5. A cover 7 that is provided with a drip stop 6 serves to close the gravity feed container 5 of plastic or metal, wherein said cover is removably secured to the top edge of the gravity feed container 5 with the aid of a thread 8 or the like. In its conically tapered bottom section 9, the gravity feed container 5 has a bore with an essentially hollow-cylindrical connecting part 10 firmly inserted therein. The connecting part 10 that, for example, consists of metal, comprises an upper hexagonal installation region 11, a connecting region 12 arranged underneath this, and a bottom guide region 13 that engages into the receiving bore 4.

A screw-wedge element 14 is arranged on the outer periphery of the cylindrical connecting region 12 such that it extends over part of its circumference, wherein said screw-wedge element can be engaged with a corresponding counter element 15 on the inner side of a projection 16 situated above the receiving bore 4 on the connecting part 3 of the gun body 2. In the embodiment shown, the screw-wedge element 14 consists of a radially outward protruding wedge-type profile of trapezoidal cross section that extends over ¾ of the circumference of the cylindrical connecting region 12 in the form of a helix with an angle of inclination $\phi$. A recess 19 for the projection 16 is arranged on the outer circumference of the connecting element 12 between the lower beginning 17 and the upper end 18 of the screw-wedge element 14. The counter element 15 is realized in the form of a helically extending wedge-type groove that also has an angle of inclination $\phi$.

A conical sealing surface 20 is situated on the lower end of the connecting part 10. This sealing surface comes in contact with a corresponding conical counter surface 21 in the interior of the receiving bore 4 when the connecting part 10 is inserted into the receiving bore 4. The position of the sealing surface 20 and the counter surface 21, as well as the position of the screw-wedge element 14 and the counter element 15, are adapted to one another such that the beginning 17 of the screw-wedge element 14 is engaged with the counter element 15 in the form of a wedge-type groove when the connecting part 10 inserted into the receiving bore 4 is turned. This takes place such that the upper wedge surface 24 of the screw-wedge element 14 already makes contact with the corresponding counter surface 25 of the wedge-type groove 14 when the connecting part is turned between one-quarter and one-half turns.

In the embodiment shown in FIGS. 1a, 1b, 2a and 2b, an additional mounting thread 22 is provided in the upper section of the guide region 13. This mounting thread makes it possible to also mount the gravity feed container 5 on a standard paint spraying gun provided with an internal thread, as shown in FIGS. 3a, 3b, 4a and 4b. The additional mounting thread 22 can, however, be made shorter than conventional mounting threads such that, for example, only 1.5 to 2 turns are required to attach the gravity feed container 5 according to the invention to conventional paint spraying guns. The inside diameter of the receiving bore 4 in the gun body 2 shown in FIGS. 1a, 1b, 2a and 2b is slightly larger than the outside diameter of the mounting thread 22, such that the mounting thread 22 laterally guides the connecting piece 10 within the receiving bore 4. A paint screen, not shown, which is inserted into the lower end of the connecting part 10 is able to engage into the lower reduced section 26 of the receiving bore 4. The additional mounting thread 22 is not required in instances in which the connecting part 10 is only intended to be mounted by means of the screw-wedge element 15 [sic; 14].

Figures 5A, 5B:
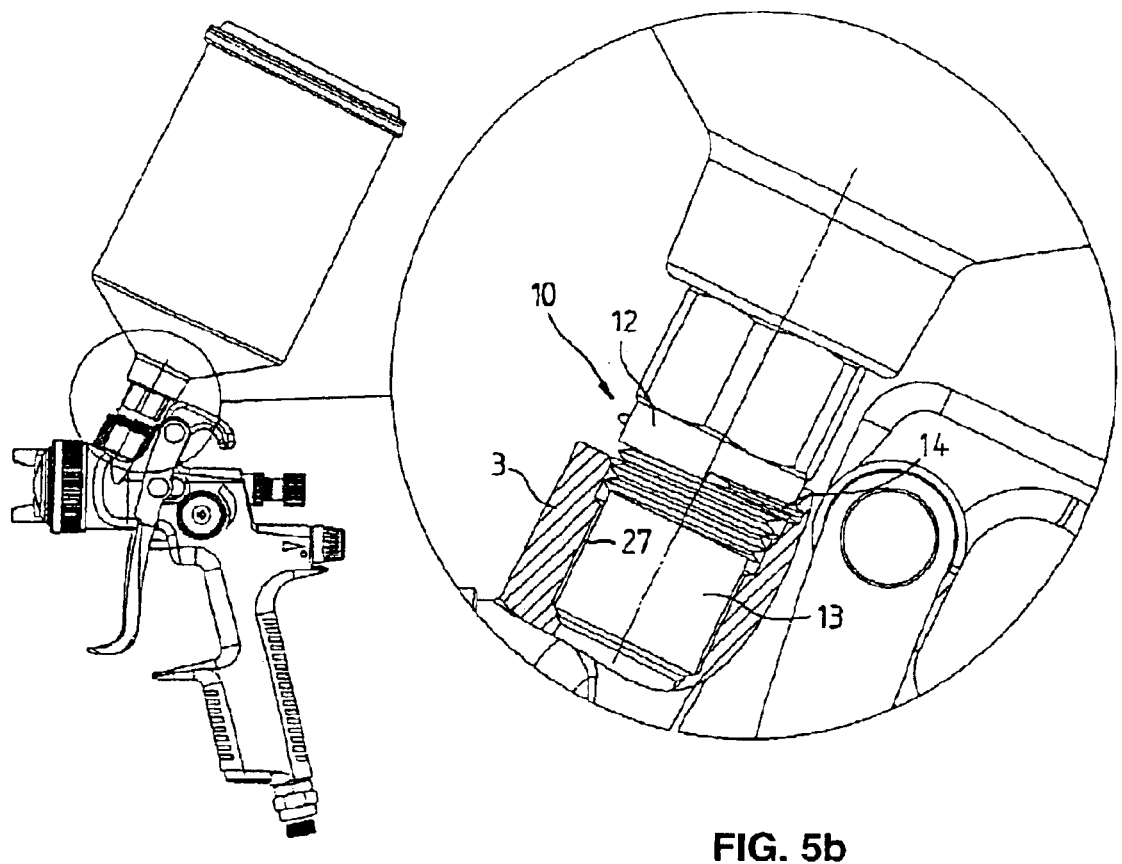
FIGS. 5a and 5b shows another embodiment of a paint spraying gun according to the invention with a paint receptacle.

According to FIGS. 5a and 5b lateral guidance of the connecting part 10 into the gun body can also be realized with the cylindrical section of the guide region 13, wherein a slight clearance of, for example, 2/10 mm is provided between this section of the guide region and an additionally reduced inner wall 27 of the receiving bore 4.

In order to attach the previously described gravity feed container 5 to the paint spraying gun illustrated in FIGS. 1*a*, 1*b*, 2*a* and 2*b*, the connecting part 10 initially needs to be inserted into the receiving bore 4 in such a position that the projection 16 is able to engage into the recess 19. Once the lower sealing surface 20 of the connecting part 10 makes contact with the corresponding counter surface 21 of the receiving bore 4, the screw-wedge element 14 in the form of a wedge-type profile is able to initially engage into the counter element 15 in the form of a wedge-type groove with a certain play when the gravity feed container 5 is correspondingly turned. The upper wedge surface 24 comes in contact with the corresponding counter surface 25 when the gravity feed container is additionally turned, such that the gravity feed container 5 is frictionally attached to the gun body 2. The gravity feed container 5 is partially turned in the opposite direction in order to rapidly remove the container from the gun body 2.

Although the invention has been described with respect to preferred embodiments, changes and modifications are possible that do not depart from the teachings herein. Such changes and modifications are deemed to fall within the purview of the invention as claimed.

What is claimed is:

1. A paint spraying gun comprising a gun body having a receiving bore; a material supply device including an essentially hollow-cylindrical connecting part; a screw-wedge connection connecting the material supply device to the gun body; said screw-wedge connection comprises a screw-wedge element having opposed ends arranged on the circumference of the essentially hollow-cylindrical connecting part of the material supply device and a corresponding counter element situated on the gun body; the screw-wedge element extending over more than half of the circumference of the connecting part with its opposed ends peripherally spaced; and the counter element being a projection situated on one side of and above the receiving bore of the gun body.

2. A paint spraying gun according to claim 1, wherein the screw-wedge element is a wedge-type profile that protrudes from the connecting part, and the counter element is a wedge-type groove arranged on the inner side of the projection.

3. A paint spraying gun according to claim 1 wherein the screw-wedge element and the counter element constitute only part of one turn of the corresponding outside thread and internal thread, respectively.

4. A paint spraying gun according to claim 1, wherein the connecting part contains a guide region for guidance within the receiving bore.

5. A paint spraying gun according to claim 1, wherein the screw-wedge element has an inclined upper wedge surface that comes in contact with a corresponding counter surface of the counter element.

6. A paint spraying gun according to claim 1 wherein the screw-wedge element is one of a triangular and trapezoidal profile.

7. A paint spraying gun according to claim 1, wherein an additional mounting thread is arranged on the connecting part.

8. A paint spraying gun according to claim 1, wherein the receiving bore contains a counter surface that makes contact with a sealing surface of the connecting part.

9. A paint spraying gun according to claim 1, wherein the projection on the gun body has a smaller width than the peripheral space between the opposed ends of the screw-wedge element.

10. A paint spraying gun according to claim 1, wherein the material supply device is a paint receptacle.

11. A material supply device for a paint spraying gun comprising an essentially hollow-cylindrical connecting part to be coupled with the paint spraying gun, and a screw-wedge element having opposed ends arranged on the circumference of the essentially hollow-cylindrical connecting part that can be engaged with a corresponding counter element on a paint spraying gun, wherein the screw-wedge element extends over more than half of the circumference of the connecting part with its opposed ends spaced peripherally.

12. A material supply device for a point spraying gun according to claim 11, further comprising a guide region for laterally guiding the connecting part relative to the paint spraying gun.

13. A material supply device for a paint spraying gun according to claim 11, wherein the screw-wedge element is an outwardly protruding wedge-type profile.

14. A material supply device for a paint spraying gun according to claim 11, wherein the screw-wedge element is a partial turn of an external thread.

15. A material supply device for a paint spraying gun according to claim 11, wherein the screw-wedge element has one of a triangular and trapezoidal profile.

16. A material supply device for a paint spraying gun according to claim 11, further comprising an additional mounting thread.

17. Paint receptacle for a paint spraying gun, comprising a material supply container; said container having mounted thereon an essentially hollow-cylindrical connecting part to be coupled with the paint spraying gun, and a screw-wedge element having opposed ends arranged on the circumference of the essentially hollow-cylindrical connecting part that can be engaged with a corresponding counter element on a paint spraying gun, wherein the screw-wedge element extends over more than half of the circumference of the connecting part with its opposed ends peripherally spaced.

18. Paint receptacle according to claim 17, wherein the connecting part is fixed to the material supply container.

19. Paint receptacle according to claim 17, wherein the connecting part is integral connected with the material supply container.

* * * * *